(12) United States Patent
Hamerton

(10) Patent No.: US 11,234,412 B2
(45) Date of Patent: Feb. 1, 2022

(54) EXPELLING DEVICE AND A MILKING ARRANGEMENT PROVIDED WITH SUCH A DEVICE

(71) Applicant: DELAVAL HOLDING AB, Tumba (SE)

(72) Inventor: Lance Hamerton, Tumba (SE)

(73) Assignee: DeLaval Holding AB, Tumba (SE)

( * ) Notice: Subject to any disclaimer, the term of this patent is extended or adjusted under 35 U.S.C. 154(b) by 287 days.

(21) Appl. No.: 16/609,537

(22) PCT Filed: Apr. 27, 2018

(86) PCT No.: PCT/SE2018/050433
§ 371 (c)(1),
(2) Date: Oct. 30, 2019

(87) PCT Pub. No.: WO2018/203801
PCT Pub. Date: Nov. 8, 2018

(65) Prior Publication Data
US 2020/0077620 A1 Mar. 12, 2020

(30) Foreign Application Priority Data
May 2, 2017 (SE) .................................. 1750522-3

(51) Int. Cl.
*A01K 1/12* (2006.01)
*A01J 7/00* (2006.01)
(Continued)

(52) U.S. Cl.
CPC ..................................... *A01K 1/12* (2013.01);
*A01J 7/00* (2013.01); *A01K 1/105* (2013.01);
*G08B 5/02* (2013.01)

(58) Field of Classification Search
CPC ........ A01K 1/12; A01K 15/02; A01K 15/028; A01K 1/0029; A01K 1/0209; A01K 1/126; A01K 1/105; A01J 7/04; A01J 7/00
(Continued)

(56) References Cited

U.S. PATENT DOCUMENTS 3,699,922 A  10/1972 Holm
3,885,528 A * 5/1975 Vandenberg ............. A01K 1/12
                                                                    119/14.03
(Continued)

FOREIGN PATENT DOCUMENTS

AU           663881 B2    10/1995
EP          0189954 A1 *  8/1986  ................ A01J 7/04
(Continued)

OTHER PUBLICATIONS

International Search Report and Written Opinion, dated Jul. 4, 2018, from corresponding PCT application No. PCT/SE2018/050433.
(Continued)

*Primary Examiner* — Yvonne R Abbott-Lewis
(74) *Attorney, Agent, or Firm* — Nixon & Vanderhye

(57) ABSTRACT

An expelling device is provided that is configured to incite an animal to exit from of a milking stable in which the animal is standing during a milking session. The milking stable has a front wall element and lateral wall elements and is configured to house an animal that is being milked in the milking stable with the head directed to and close to the front wall element. The expelling device includes a sheet configured to move vertically from an elevated position to a position adjacent to a front end of the milking stable and adjacent to a lateral wall element of the milking stable.

17 Claims, 6 Drawing Sheets

(51) Int. Cl.
*A01K 1/10* (2006.01)
*G08B 5/02* (2006.01)

(58) Field of Classification Search
USPC ............................ 119/14.03, 521, 523, 63
See application file for complete search history.

(56) References Cited

U.S. PATENT DOCUMENTS

| | | | | |
|---|---|---|---|---|
| 4,513,687 | A * | 4/1985 | De Jong | A01K 5/02 |
| | | | | 119/14.03 |
| 5,365,885 | A | 11/1994 | Baxter | |
| 9,320,261 | B2 | 4/2016 | Axelson et al. | |
| 2001/0042515 | A1 | 11/2001 | Gallagher et al. | |
| 2007/0186859 | A1 * | 8/2007 | Moreau | A01K 1/12 |
| | | | | 119/14.03 |
| 2008/0302310 | A1 * | 12/2008 | Kleinsasser | A01K 1/0017 |
| | | | | 119/521 |
| 2012/0272913 | A1 * | 11/2012 | Hofman | A01J 5/00 |
| | | | | 119/14.03 |
| 2015/0040834 | A1 * | 2/2015 | Loos | A01K 1/0017 |
| | | | | 119/518 |

FOREIGN PATENT DOCUMENTS

| | | |
|---|---|---|
| EP | 0189954 A1 | 8/1986 |
| EP | 0451906 A1 | 10/1991 |
| EP | 1611783 A1 | 1/2006 |
| WO | 2011/089113 A1 | 7/2011 |
| WO | 2013/009250 A1 | 1/2013 |

OTHER PUBLICATIONS

SE Search Report, dated Nov. 8, 2017, from corresponding SE application No. 1750522-3.

* cited by examiner

EXPELLING DEVICE AND A MILKING ARRANGEMENT PROVIDED WITH SUCH A DEVICE

TECHNICAL FIELD

The present invention relates to an expelling device, configured to incite an animal to exit from of a milking stable in which the animal is standing during a milking session and in connection to which the expelling device is configured to be arranged, wherein the milking stable is of a type which has a front wall element and lateral wall elements and is configured to house an animal that is being milked in said milking stable with its head directed to and close to said front wall element.

The present invention also relates to a milking arrangement, comprising a milking stable, wherein said milking stable has a front wall element and lateral wall elements and is configured to house an animal that is being milked in said milking stable with its head directed to and close to said front wall element, wherein the milking arrangement comprises an expelling device according to the invention.

BACKGROUND ART

Milking arrangements for the milking of animals, primarily for the milking of cows, may comprise milking stables that comprise a front wall element, lateral wall elements and, sometimes, a rear wall element, possibly formed by a retention bar that can be opened in order to enable entrance and exit of the animal. An automatic milking device may be arranged in connection to the milking stable, and in a front end of the milking stable there may be provided food manger for the feeding of the animals during a milking session.

The operation of many milking arrangements is based on the principle that the animal itself decides when to enter the milking stable on an optional basis. However, the animals are not allowed to remain in the milking stable more than a predetermined time after the milking session has ended. This is in particular the case with so called rotary parlours in which a plurality of milking stables are provided side by side on a rotating platform, and the milking arrangement comprises a fixed exit configured to enable exit of an animal from a first milking stable facing said exit, and a fixed entrance configured to enable entrance of an animal into a neighbouring second milking stable facing said entrance, wherein the exit is adjacent the entrance and the exit and entrance of animals take place in neighbouring first and second milking stables.

However, for several reasons, the animals, or at least some animals, tend to remain in the milking stable when the milking session is over and when they are assumed to leave the milking stable. One such reason may be that they want to continue eating, either of their own food, if there is anything left in their own manger, or of the food they can spot in the neighbouring milking stable. Typically, in a rotary parlour, the animal's own manger is empty when the milking stable reaches the exit, but the manger of a neighbouring milking stable, which faces the entrance, is full. Thus, the animal may wish to stay in the milking stable and even try to get some of the neighbour's food. But there could also be all sorts of other reasons to why the animal does not want to leave its milking stable. The animal may, for example, simply be interested in its neighbour animal, or just unwilling to move.

In order to force animals to leave a milking stable prior art suggests all sorts of devices and methods for inciting the animal to leave the milking stable. Devices for generating a noise or for generating a pressurised air flow towards the animal have been suggested, as well as more tactile methods in which the animal is hit by something or frightened by something that looks like it will hit the animal. The common feature of these devices and methods is that they focus on scaring the animal or making the animal feel uncomfortable, so that it will leave the milking stable. Some of the devices and methods, like noise-generating devices, have the disadvantage of also possible making it somewhat uncomfortable for other animals, that are not yet supposed to leave their milking stables or are supposed to enter a milking stable.

The object of the invention is to present an alternative expelling device for inciting an animal, typically a cow, to exit a milking stable.

Another object of the present invention is to present an expelling device which is particularly suitable for being mounted at an exit of a rotary parlour.

It is also an object of the present invention to present an alternative milking arrangement comprising a milking stable and an expelling device for inciting an animal, typically a cow, to exit the milking stable.

SUMMARY OF THE INVENTION

The object of the present invention is achieved by an expelling device, configured to incite an animal to exit from of a milking stable in which the animal is standing during a milking session and in connection to which the expelling device is configured to be arranged, wherein the milking stable is of a type which has a front wall element and lateral wall elements and is configured to house an animal that is being milked in said milking stable with its head directed to and close to said front wall element, said expelling device being characterised in that it comprises a sheet configured to move vertically from an elevated position to a position adjacent to a front end of the milking stable and adjacent to a lateral wall element of the milking stable.

The present invention differs from prior art devices and methods in that it achieves its goal not so much by frightening the animal or making the animal feel uncomfortable as by distracting the animal and preventing it from seeing what is going on laterally outside its own milking stable. Thereby, the animal loses interest in, for example, the food manger of a neighbouring milking stable or another animal standing in a neighbouring milking stable or close to and outside the milking stable of the animal in question. This is a significant and essential difference from prior art. However, the invention does not exclude that the sheet may also to some extent frighten the animal as it is moves vertically to its active position close to the assumed position of the head of the animal. And if the animal accidentally has its head where the sheet is moved to its active position, the animal may get hit by the sheet. This possible result cannot be excluded. The term "adjacent to" as used in this context may be referred to as within a distance of 20 cm from the front wall element and within a distance of 10 cm from the lateral wall element, preferably within a distance of 5 cm from the lateral wall element. Preferably, the sheet overlaps the lateral wall element when it is in its lowered, active (also referred to as operative) position. The wall elements are formed by a framework design. Thus it is possible for an animal to look out of the milking stable through rather large openings in the lateral wall elements. It may even be possible for the animal to reach out with its nose or tongue through such an opening, possibly into a neighbouring milking stable if there is such a one. The sheet of the invention at least partly prevents such access to a neighbouring stable.

According to one embodiment, the sheet is opaque. Thereby, the animal is given no chance of looking through the sheet and out of milking stable.

According to one embodiment, the sheet has a main extension plane and has an area of at least 10 dm² in said main extension plane. The sheet is assumed to work as a curtain that prevents the animal from looking out of the milking stable in a predetermined lateral direction, especially towards the manger of a neighbouring milking stable if there is such a one. In order to achieve that goal, the sheet should not be too small. According to one embodiment, the sheet has an area of at least 20 dm² in said main extension plane. When the sheet is in its active position, i.e. the position in which it is adjacent to the lateral wall and to the front wall, the main extension plane of the sheet shall be generally in parallel with a main extension plane of the lateral wall element, at least in the region of the lateral wall element where the sheet will be located.

According to one embodiment, the sheet comprises an outer surface made of rubber. In case the sheet would hit the head of the animal, the rubber surface provides for a softness that prevents hurting the animal.

According to one embodiment, the expelling device comprises a suspension arm and a suspension wire that extends from the suspension arm and that is connected to the sheet in one end of the wire. The suspension arm may be an arm that is provided with attachment means for attachment to an existing part of a milking arrangement that includes said milking stable. Thereby the expelling device becomes an add-on device which can easily be attached to existing milking arrangements. By using a wire, the motion of the sheet can be controlled, either manually or automatically. In case of manual control from a remote spot to which the wire extends, a human being may pull or relieve the wire via a handle or similar.

According to one embodiment, the expelling device comprises a power device configured to control the position of the sheet by pulling or relieving the wire. The power device could be any suitable power device, such as a reel driven by an electric motor, a pneumatic power cylinder-piston unit, a vacuum powered cylinder-piston or the like.

According to one embodiment, the power device is connected to a manoeuvre element configured to be manually controlled and configured to control the operation of the power device. The manoeuvre element may be a push button or a switch by means of which the operation of the power device is controlled.

According to one embodiment, the expelling device comprises a detecting means configured to detect the presence of an animal in a milking stable at which the expelling device is configured to be arranged, and a control units wherein said control unit is connected to the detecting means and the power device and configured to control the operation of the power device on basis of information received from the detecting means. Thereby a fully automatic operation of the expelling device can be achieved. The detecting means may, for example, be optical detecting means, such as a camera. The control unit may form part of a controller for controlling the overall operation of an automatic milking arrangement. Other automatic control principles of the expelling device may also be applied. For example the control unit may be configured to control the operation of the power device on basis of detected position of a platform of a rotary parlour or on basis of detected ending of a milking session.

The objective of the invention is also achieved by means of a milking arrangement, comprising a milking stable, wherein said milking stable has a front wall element and lateral wall elements and is configured to house an animal that is being milked in said milking stable with its head directed to and close to said front wall element, said milking arrangement being characterised in that it comprises an expelling device according to the present invention. The milking stable may be a milking stable as described hereinabove, comprising a milking device, a food manger, and wherein the wall elements are formed by a framework.

According to one embodiment, the milking arrangement comprises at least one further, second milking stable, wherein the first and the second milking stables are divided by the lateral wall element adjacent to which the sheet is configured to move from said elevated position.

According to one embodiment, each of the first and second milking stables comprises a food manger, and the sheet, when moved to its position adjacent to the lateral wall element, is configured to prevent an animal stationed in the first milking stable from seeing the food manger in the second milking stable.

According to one embodiment, each of the first and second milking stables comprises a food manger, and the sheet, when moved to its position adjacent to the lateral wall element, is configured to prevent an animal stationed in the first milking stable from reaching the food manger in the second milking stable.

According to one embodiment, the milking arrangement is a rotary parlour in which a plurality of milking stables are provided side by side on a rotating platform, wherein the milking arrangement comprises a fixed exit configured to enable exit of an animal from a first milking stable facing said exit, and a fixed entrance configured to enable entrance of an animal into a neighbouring second milking stable facing said entrance, wherein the exit is adjacent the entrance and the exit and entrance of animals take place in neighbouring first and second milking stables. The exit and entrance may be formed by frame work designs. The exit and entrance will be at the rear end of the milking stables as the milking stables faces the exit and the entrance. As a result thereof, the animal is incited by the expelling device to back off from the milking stable through an opening at a rear part thereof.

According to one embodiment, the expelling device is stationary arranged at the exit. In other words, the expelling device does not follow the rotating part of the rotary parlour.

The invention also relates to a method of controlling the position of a sheet of an expelling device according to the present invention in a milking arrangement according to the present invention, characterised in that the sheet is moved from an elevated position to an operative position adjacent to a front end of the milking stable and adjacent to a lateral wall element of the milking stable upon detection of the following condition:

an animal is present in the milking stable, and it is decided that the animal shall leave the milking stable.

The presence of the animal in the milking stable may be achieved by ocular registration by an operator or by use of a detection device, such as a photo cell or a camera. The decision that the animal shall leave the milking stable may be based on the position of the milking stable, if the milking arrangement is a rotary parlour, or on the basis of lapse of predetermined time after finished milking, if the milking stable is a fixed stable.

Further features and advantages of the present invention will be presented in the following, detailed description of exemplifying embodiments.

DETAILED DESCRIPTION

Figure 1:
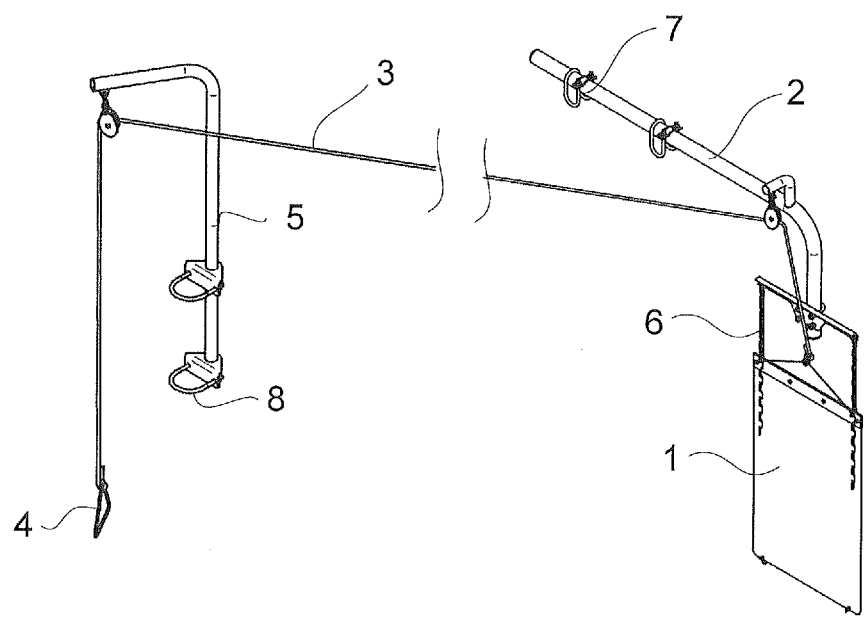
FIG. 1 is a perspective view showing essential parts of a first embodiment of an expelling device according to the invention.

FIG. 1 shows a first embodiment of an expelling device according to the present invention. The expelling device comprises a sheet 1, a suspension arm 2, a wire 3, and a handle 4 at the end of the wire 3 which is remote from the sheet 1. There is also provided a redirecting arm 5 which has the function of redirecting the wire 3 and making it easy to position the handle 4 so that it can be easily reached by a person that manually operates the sheet 1 pulling or relieving the wire 3 from a position remote from a milking stable in which the sheet 1 is to be introduced in order to incite an animal therein to exit from the milking stable.

The sheet 1 may be made of rubber or plastic material of certain flexibility, is opaque and has a square main surface with an area which is larger than 10 dm². The wire 3 is attached to the sheet 1 via chains 6 or ropes or similar. The suspension arm 2 has attachment means formed by clamps 7 that enable it to be easily attached to bars or the like of an existing milking arrangement. Also the redirecting arm 5 has attachment means formed by clamps 8 that enable it to be easily attached to a bar or the like of an existing milking arrangement.

Figure 2:
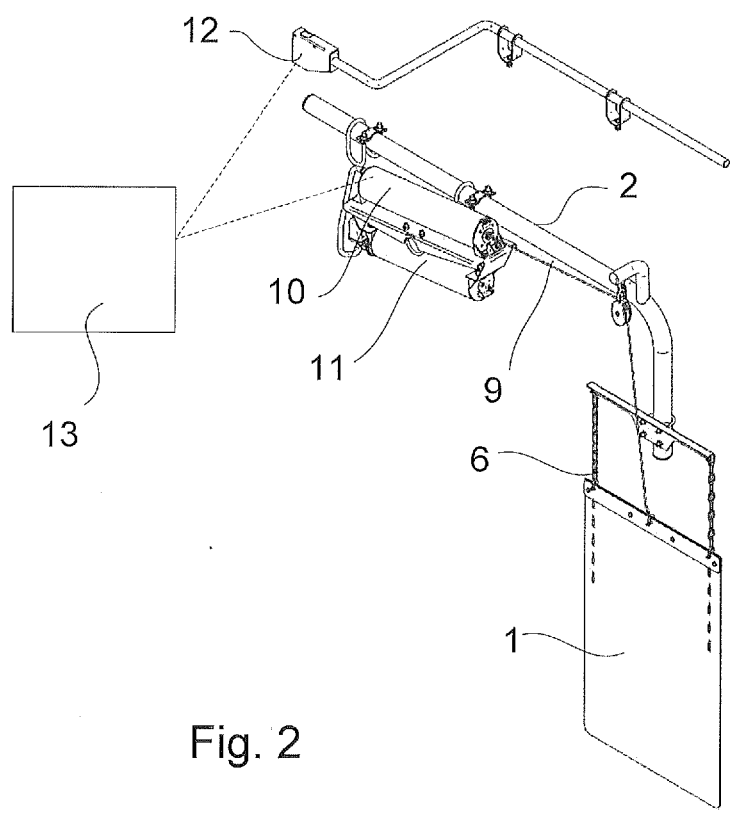
FIG. 2 is perspective view showing essential parts of a second embodiment of an expelling device according to the invention.

FIG. 2 shows an alternative, second embodiment of an expelling device according to the invention. The expelling device comprises a sheet 1 corresponding to the sheet in the first embodiment, a suspension arm 2 corresponding to the suspension arm in the first embodiment, a wire 9 and a power device 10 configured to control the position of the sheet by pulling or relieving the wire 9. The power device 10 is attached to the suspension arm 2. The wire 9 is in one end connected to the sheet 1 and in another end connected to the power device 10. The power device 10 may comprise a pneumatic power cylinder 11 with a movable piston (not shown) inside. The wire 9 is connected to the piston. In series with the pneumatic power cylinder 10 there is provided an auxiliary pneumatic power cylinder 11, which can bring auxiliary power to the first pneumatic cylinder 10 in case of need. The pneumatic cylinders 10, 11 should be connected to a pneumatic power source.

The expelling device shown in FIG. 2 comprises a detecting means 12 configured to detect the presence of an animal in a milking stable at which the expelling device is configured to be arranged. The detecting means 12 of the exemplifying embodiment shown in FIG. 2 comprises a photo cell, but a camera or the like could be used as an alternative. The expelling device further comprises a control unit 13, wherein said control unit 13 is connected to the detecting means 12 and the power device 10 and configured to control the operation of the power device 10 on basis of information received from the detecting means 12. The control unit 13 may be a separate control unit or form part of a controller for other functions of a milking arrangement.

The expelling device may, as an alternative to the embodiment shown in FIG. 2, comprise a manoeuvre element such as a push button or a switch (not shown) configured to be manually controlled and configured to control the operation of the power device 10. Such a manoeuvre element may connected to the power device 10 by wire or wirelessly.

Figure 3:
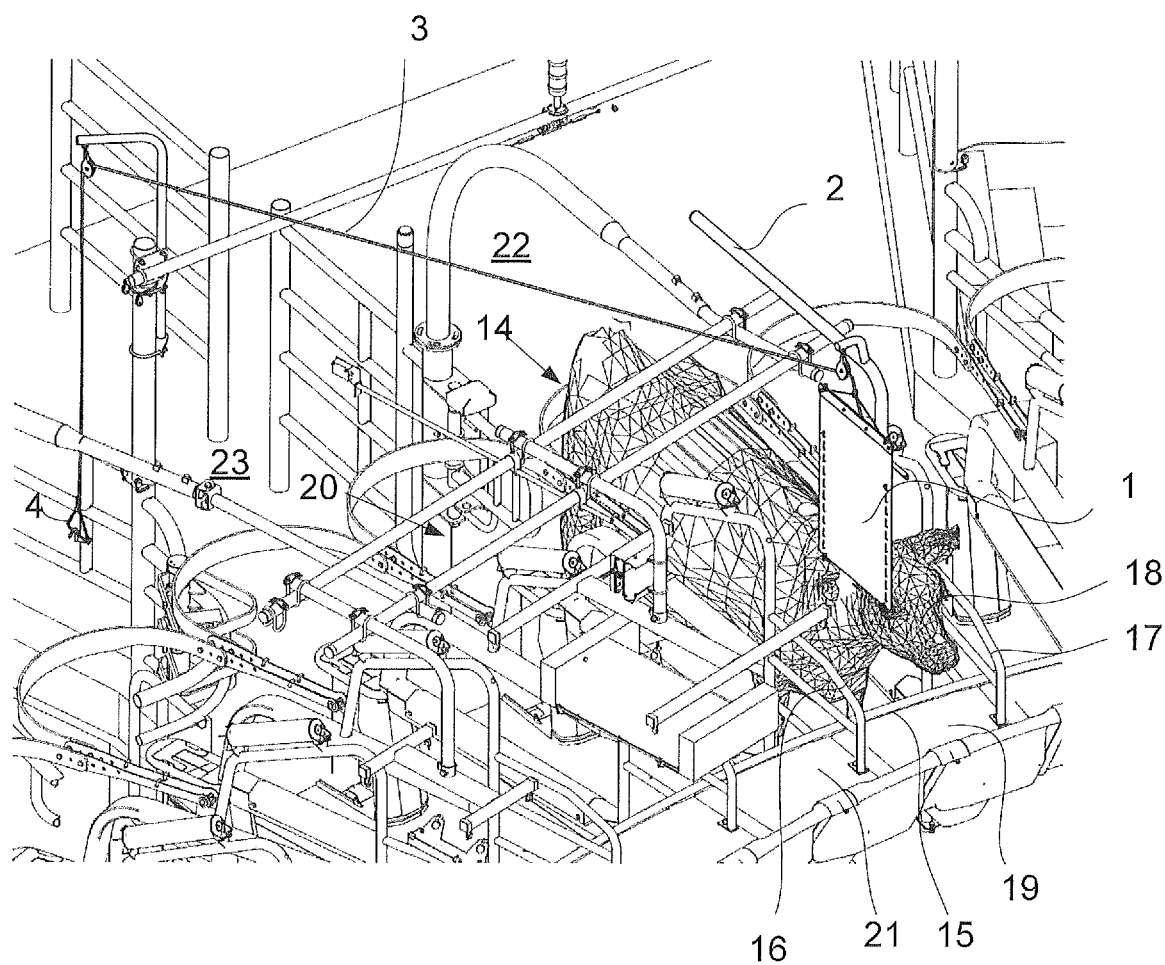
FIG. 3 is a perspective view of a milking arrangement according to the invention provided with the expelling device shown in FIG. 1 in a first position.

FIG. 3 shows a milking arrangement comprising a milking stable 14, wherein said milking stable 14 has a front wall element 15 and lateral wall elements 16, 17 and is configured to house an animal 18 that is being milked in said milking stable 14 with its head directed to and close to said front wall element 15. The milking arrangement comprises an expelling device according to the first embodiment shown in FIG. 1, with the sheet 1 shown in an elevated position.

The milking stable 14 also comprises a food manger 19. The food manger 19 is located at a front end of the milking stable 14 adjacent to the front wall element 15. In the embodiment shown, the front wall element 15 is at a rather low level, and the food manger 19 is located outside the area delimited by the front wall element 15 and the lateral wall elements 16, 17. The animal 18 is assumed to lean its head over the upper part of the front wall element 15 in order to reach into the food manger 19.

The sheet 1 of the expelling device is configured to move vertically from an elevated position to an operative position adjacent to a front end of the milking stable 14 and adjacent to a lateral wall element 16 of the milking stable 14. The movement of the sheet 1 is performed through manual operation of the wire 3. When the sheet 1 is in said operative position, the main extension plane of the sheet 1 is generally parallel with the main extension plane of the lateral wall element 16 and overlaps the latter.

The front wall element 15 and the lateral wall elements 16, 17 are framework designs that enable the animal 18 to see out of the milking stable 14.

The milking arrangement comprises at least one further, second milking stable 20, wherein the first and the second milking stables 14, 20 are divided by the lateral wall element 16. When the sheet 1 is in the elevated position, it is above the lateral wall element 16, thereby enabling the passage of the latter beneath the sheet 1. When the sheet 1 is in its operative position (see FIG. 4), the sheet 1 prevents the animal 18 from seeing a front part of the neighbouring milking stable 20, in particular from seeing a food manger 21 of the neighbouring milking stable 20.

The milking arrangement is a rotary parlour in which a plurality of milking stables are provided side by side on a rotating platform. The milking arrangement comprises a fixed exit 22 delimited by a fence configured to enable exit of an animal from a first milking stable 14 facing said exit 22, and a fixed entrance 23 configured to enable entrance of an animal into a neighbouring second milking stable 20 facing said entrance 23, wherein the exit 22 is adjacent the entrance 23 and the exit and entrance of animals take place in neighbouring first and second milking stables 14, 20. In the specific embodiment shown, each milking stable is also provided with a retention bar 24 in the rear end of the milking stable. The retention 24 bar is automatically opened when the milking stable 14 reaches the exit 22 and closed as soon as an animal has entered the milking stable at the entrance 23. In the figures though, the retention bars 24 of the milking stables 14 and 20 facing the exit 22 and the entrance 23 have not yet been opened.

The sheet 1 is moved to the operative position when the milking stable 14 has reached a predetermined position and it is detected that there is still an animal there inside. When the animal has left the milking stable 14 and the milking stable 14 is to continue from exit 22 to the entrance 23, the sheet 1 is returned to its elevated position.

Figure 4:
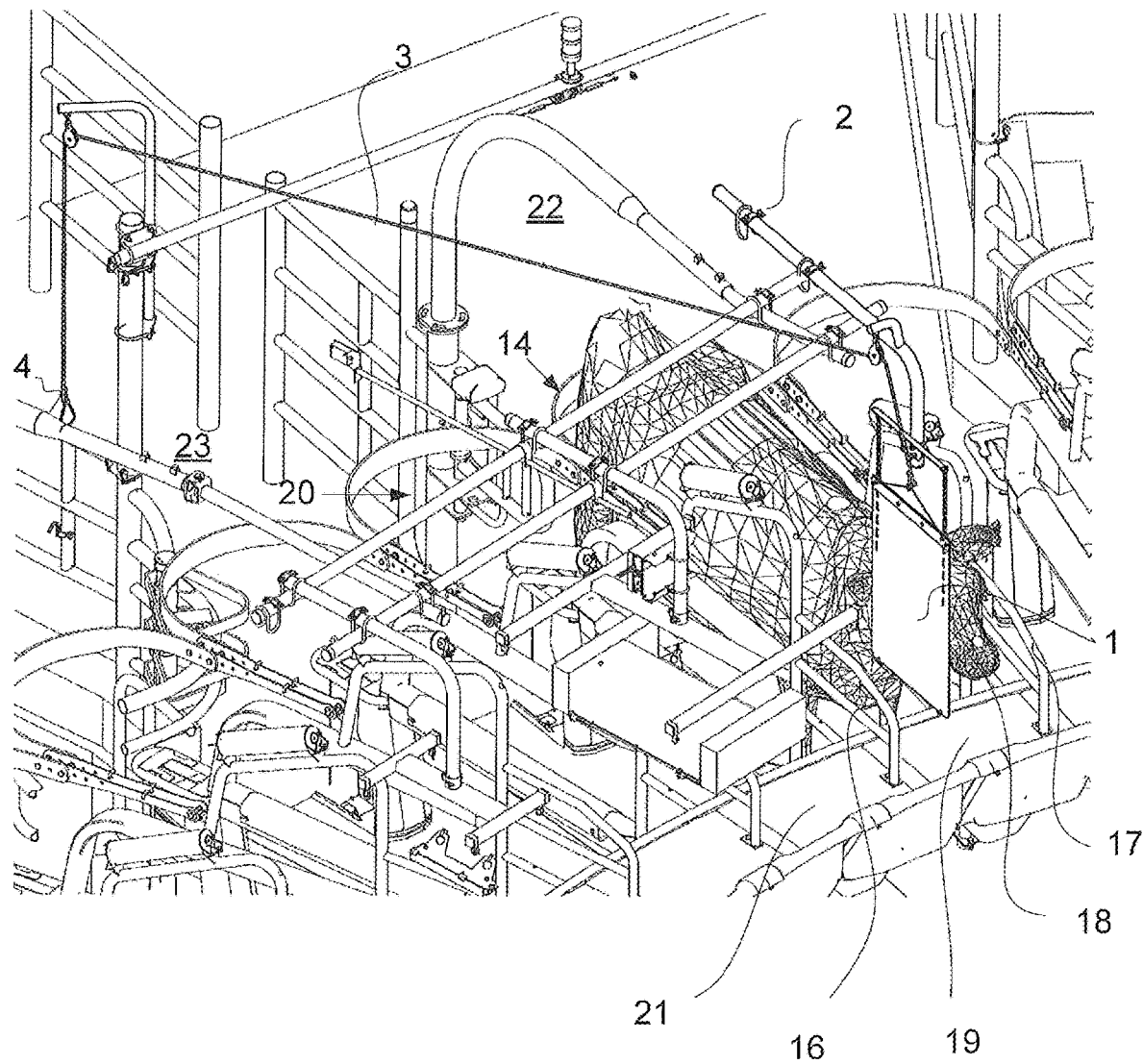
FIG. 4 is a perspective view of the milking arrangement shown in FIG. 3, with the expelling device in a second position.
Figure 5:
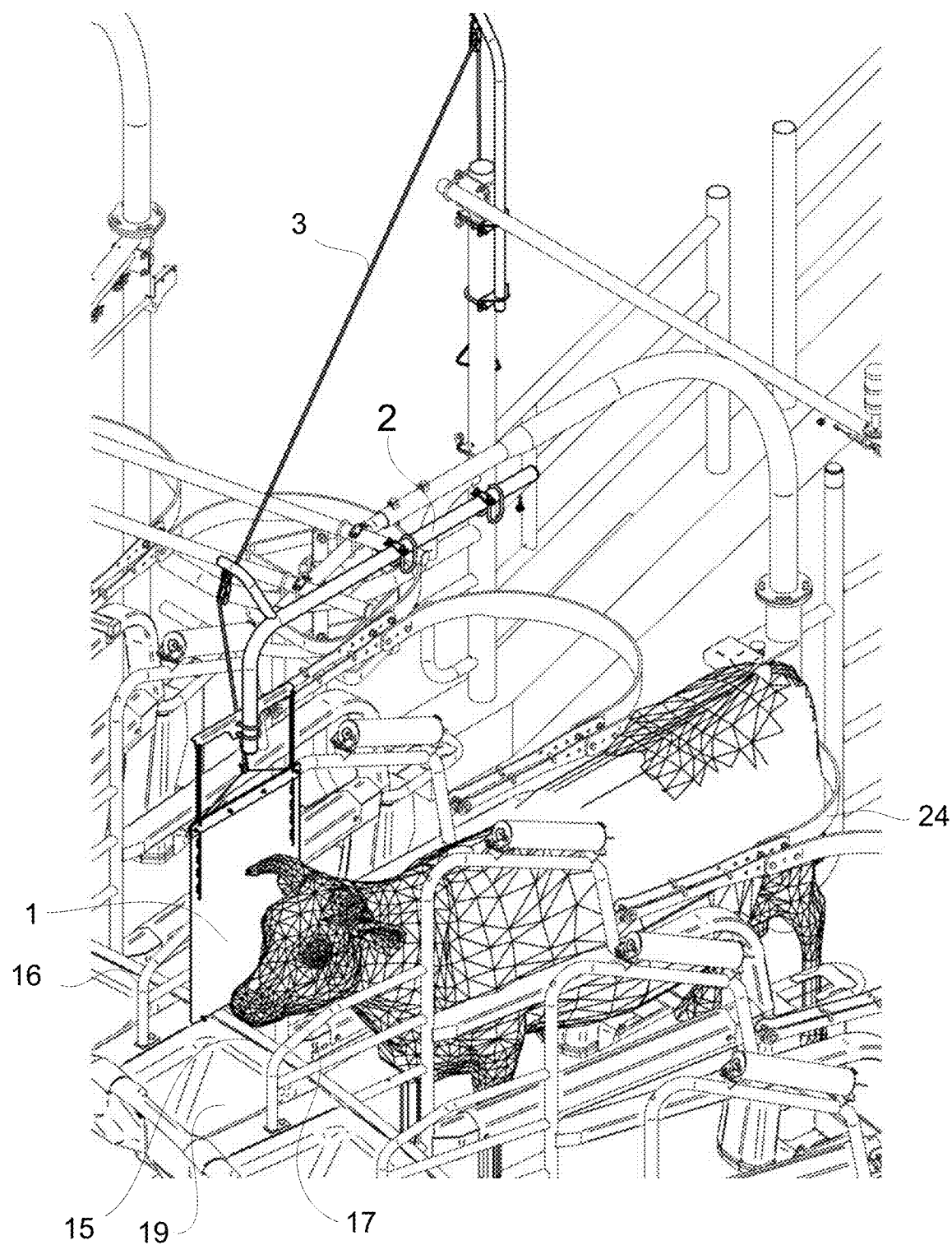
FIG. 5 is a perspective view showing the milking arrangement according to FIG. 4 from another angle.
Figure 6:
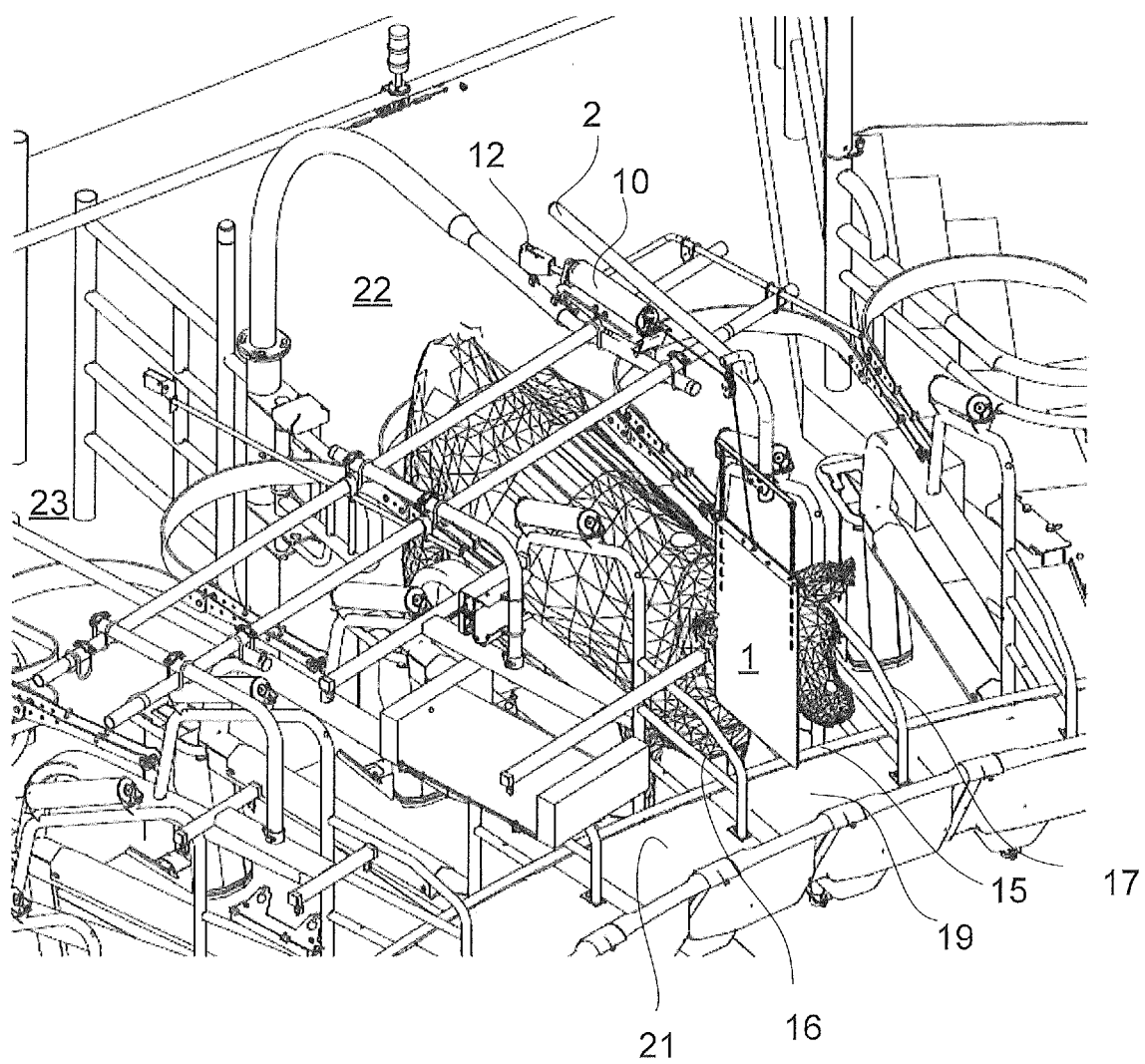
FIG. 6 is a perspective view showing milking arrangement according to the invention provided with the expelling device shown in FIG. 2, with the expelling device in an active position.
Figure 7:
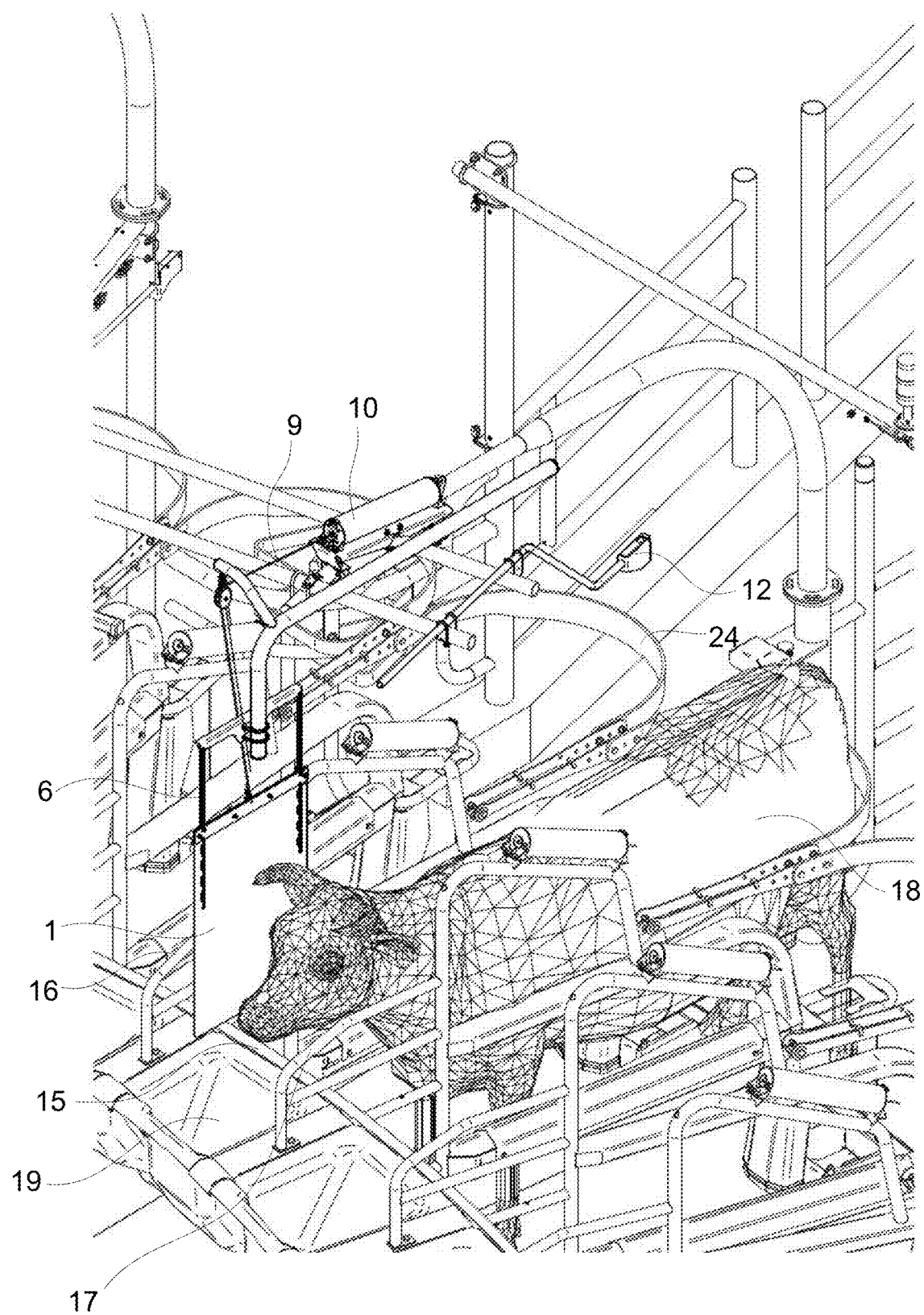
FIG. 7 is a perspective view showing the milking arrangement according to FIG. 6 from another angle.

FIGS. 6 and 7 differ from FIGS. 4-6 in that the expelling device is an expelling device according to the second embodiment shown in FIG. 2. Accordingly, the operation is either semi-automatic, when a push button or switch is used to manually control the operation of the power device 12, or fully automatic, when a control unit such as control unit 13 in FIG. 2 is used for controlling the operation of the power device 10, preferably on basis of information from the detection device 12.

The invention claimed is:

1. An expelling device configured to be connected to a milking stable and to incite an animal to exit from the milking stable in which the animal is standing during a milking session, the milking stable having a front wall element and lateral wall elements and being configured to house the animal that is being milked in said milking stable with the head of the animal directed to and close to said front wall element, said expelling device comprising:
   a sheet configured to move vertically from an elevated position to a position adjacent to a front end of the milking stable, adjacent to a lateral wall element of the milking stable, at least a portion of the sheet being disposed within the milking stable in an area delimited by the front wall element and the lateral wall elements at the position adjacent to the front end of the milking stable.

2. The expelling device according to claim 1, wherein the sheet is opaque.

3. The expelling device according to claim 1, wherein the sheet has a main extension plane and has an area of at least 10 dm$^2$ in said main extension plane.

4. The expelling device according to claim 1, wherein the sheet comprises an outer surface made of rubber.

5. The expelling device according to claim 1, further comprising:
   a suspension arm; and
   a suspension wire that extends from the suspension arm and that is connected to the sheet in one end of the wire.

6. The expelling device according to claim 5, further comprising a power device configured to control the position of the sheet by pulling or relieving the wire.

7. The expelling device according to claim 6, wherein the power device is connected to a maneuver element configured to be manually controlled and configured to control the operation of the power device.

8. The expelling device according to claim 6, further comprising
   a detector configured to detect the presence of an animal in a milking stable at which the expelling device is configured to be disposed; and a control unit connected to the detector and the power device and configured to control the operation of the power device based on information received from the detector.

9. The expelling device according to claim 6, wherein the power device is a pneumatic power cylinder.

10. A method of controlling the position of a sheet of the expelling device according to claim 1 in a milking arrangement, the method comprising:
    moving the sheet from an elevated position to an operative position adjacent to a front end of the milking stable and adjacent to one of the lateral wall elements of the milking stable upon detection of the following conditions:
    the animal being present in the milking stable, and
    it is determined that the animal shall leave the milking stable.

11. The expelling device according to claim 1, wherein the milking stable includes a food manger disposed at a front portion of the milking stable outside an area delimited by the front wall element and the lateral wall elements, and
    the sheet is configured to move vertically from the elevated position to the position adjacent to the front end of the milking stable, adjacent to the lateral wall element of the milking stable, and within the milking stable.

12. A milking arrangement, comprising:
    a first milking stable having a front wall element and lateral wall elements, the milking stable being configured to house an animal that is being milked in said milking stable with the head of the animal directed to and close to said front wall element; and
    an expelling device comprising a sheet configured to move vertically from an elevated position to a position adjacent to a front end of the milking stable, adjacent to a lateral wall element of the milking stable, at least a portion of the sheet being disposed within the milking stable in an area delimited by the front wall element and the lateral wall elements at the position adjacent to the front end of the milking stable.

13. The milking arrangement according to claim 12, further comprising at least one second milking stable,
    wherein the first and the second milking stables are divided by the lateral wall element adjacent to which the sheet is configured to move from said elevated position.

14. The milking arrangement according to claim 13, wherein the second milking stable comprises a food manger, and
    the sheet, when moved to the position adjacent to the lateral wall element, is configured to prevent the animal stationed in the first milking stable from seeing the food manger in the second milking stable.

15. The milking arrangement according to claim 13, wherein the second milking stable comprises a food manger, and
    the sheet, when moved to the position adjacent to the lateral wall element, is configured to prevent an animal stationed in the first milking stable from reaching the food manger in the second milking stable.

16. The milking arrangement according to claim 12, wherein the milking arrangement is a rotary parlor in which a plurality of milking stables are provided side-by-side on a rotating platform, and
    the milking arrangement further comprises a fixed exit configured to enable exit of the animal from the first milking stable facing said exit, and a fixed entrance configured to enable entrance of another animal into a neighboring second milking stable facing said entrance, the exit being adjacent the entrance, the exit and entrance of animals taking place in the neighboring first and second milking stables.

17. The milking arrangement according to claim 16, wherein the expelling device is stationary and arranged at the exit.

* * * * *